Patented May 9, 1944

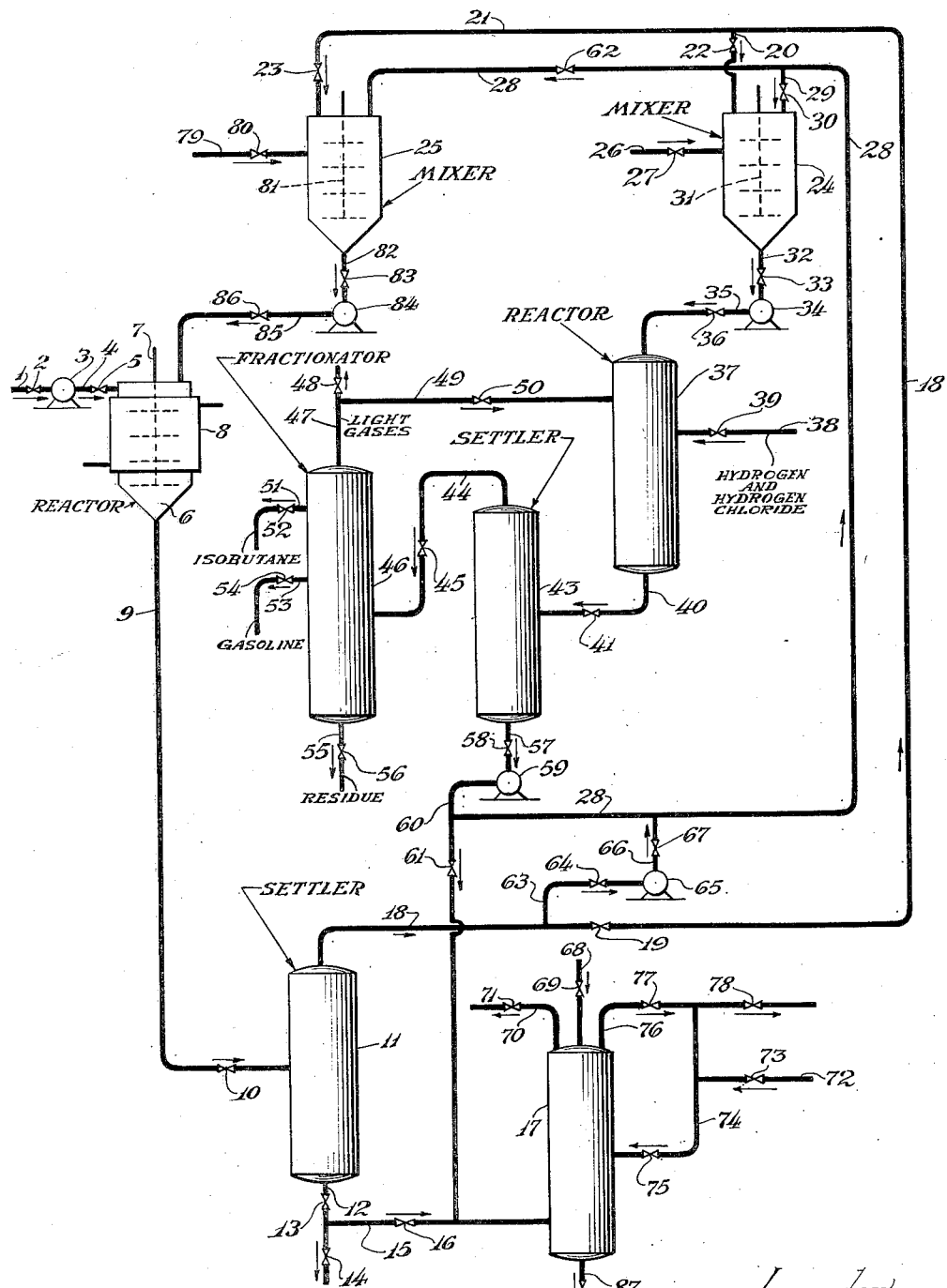

2,348,701

UNITED STATES PATENT OFFICE 2,348,701

TREATMENT OF HYDROCARBONS

Louis Schmerling, Chicago, Ill., assignor to Universal Oil Products Company, Chicago, Ill., a corporation of Delaware Application June 29, 1940, Serial No. 343,189

7 Claims. (Cl. 196—54)

This invention relates to the treatment of hydrocarbon oils to produce therefrom substantial yields of isobutane and substantially saturated gasoline of high antiknock value.

In a more specific sense the invention is concerned with a process for converting hydrocarbon oils containing paraffinic, olefinic, naphthenic, and aromatic hydrocarbons into substantial yields of isobutane and of substantially saturated hydrocarbons of motor fuel boiling range. The process involves the use of special catalysts and conditions of operation which favor destructive hydrogenation and isomerization reactions.

The usual procedure of reforming petroleum fractions with aluminum chloride and hydrogen chloride in the presence of hydrogen has the disadvantage that olefinic and aromatic hydrocarbons contained in the petroleum fraction react with aluminum chloride forming tar-like sludge which decreases the catalytic activity of aluminum chloride. According to the present invention, formation of tar upon the catalyst is substantially avoided and the olefinic and aromatic hydrocarbons, as well as the paraffins and naphthenes, are converted into substantial yields of isobutane and of saturated motor fuel containing substantially paraffinic and naphthenic hydrocarbons.

In one specific embodiment the present invention comprises a process for treating a hydrocarbon oil to produce therefrom substantial yields of isobutane and substantially saturated motor fuel which comprises treating said hydrocarbon oil at a relatively low temperature with a commingled mixture of aluminum chloride and a portion of a relatively light sludge formed in the process to produce a substantially saturated hydrocarbon mixture and a relatively heavy sludge; separating said substantially saturated hydrocarbon mixture from said relatively heavy sludge; heating said relatively heavy sludge at a relatively higher temperature in the presence of added hydrogen and hydrogen chloride to recover from said sludge relatively pure aluminum chloride; commingling said substantially saturated hydrocarbon mixture with aluminum chloride and a relatively light sludge formed in the process to form a commingled mixture; adding a portion of said commingled mixture to the oil charged to remove unsaturated and aromatic hydrocarbons therefrom, conducting the remainder of said commingled mixture to reaction at a destructive hydrogenating temperature and pressure in the presence of hydrogen and hydrogen chloride to yield a reaction mixture of substantially saturated gaseous and liquid hydrocarbons and a relatively light sludge; separating said reaction mixture into light gases, an isobutane fraction, a light hydrocarbon fraction, and relatively light sludge; recycling a portion of said relatively light sludge to commingle with said substantially saturated hydrocarbon mixture and aluminum chloride being conducted to destructive hydrogenation; and subjecting the remainder of said relatively light sludge in admixture with said heavy sludge to the treatment with hydrogen and hydrogen chloride in order to recover aluminum chloride therefrom.

The hydrocarbon oils with which the process of the present invention is concerned may comprise petroleum distillates such as naphtha, kerosene, and gas oil, distillates obtained from coal, and in general hydrocarbons from any other source containing not only paraffins and naphthenes but also olefinic and aromatic hydrocarbons.

An important feature of the present invention consists in treating the charged hydrocarbon oil with aluminum chloride at a relatively low temperature to remove therefrom olefinic and aromatic hydrocarbons which if allowed to remain cause excessive tar formation under the more severe temperature conditions later utilized for producing isobutane and motor fuel in the presence of hydrogen, hydrogen chloride, and a mixture of aluminum chloride and aluminum chloride-containing sludge. The presence of hydrogen is also beneficial during treatment with aluminum chloride in decreasing the rapidity of sludge formation upon the catalyst and in prolonging its active life. While it appears that anhydrous aluminum chloride as generally obtainable contains a relatively small but necessary percentage of hydrogen chloride, it has been found advisable to add relatively small but definite amounts of hydrogen chloride to the hydrocarbon oil being contacted with an aluminum chloride-containing catalyst in order to diminish the fouling of the catalyst which consequently diminishes its hydrocarbon converting activity.

One form of apparatus in which the process of this invention may be carried out for producing substantial yields of isobutane and motor fuel fractions is illustrated diagrammatically by the attached drawing.

Referring to the drawing, a hydrocarbon oil containing paraffins, olefins, naphthenes, and aromatics may be introduced through line 1 and valve 2 to pump 3 which discharges through line 4 and valve 5 into reactor 6 equipped with a mixing device 7 which may consist of a vertical shaft provided with a plurality of perforated plates and connected to a mechanism for imparting a vertical reciprocating motion to said plates. Reactor 6 may be equipped further with a cooling jacket 8 through which a cooling medium may be circulated, by means not shown, whereby the temperature of the contents of reactor 6 may be maintained at a chosen value within the approximate range of −10 to 50° C. In reactor 6 the hydrocarbon oil is commingled with a mixture of aluminum chloride and a relatively light sludge, introduced as hereinafter set forth, to effect polymerization of a part of the olefinic constituents of the oil and to cause alkylation of aromatics by olefins. Olefinic and aromatic materials may react further to form sludge while part of the olefin polymers and condensation products of olefins and aromatics may remain in the hydrocarbon layer which becomes substantially saturated as a result of the treatment with the aluminum chloride-containing sludge. The treated mixture is conducted from reactor 6 through line 9 and valve 10 to settler 11 in which a substantially saturated hydrocarbon layer is separated from a relatively heavy sludge of low catalytic activity. The relatively heavy sludge may be withdrawn through line 12 containing valves 13 and 14, or all or a part of said sludge may be conducted from line 12 through line 15 and valve 16 to recovery chamber 17, the operation of which will be described subsequently.

The hydrocarbon layer separated in settler 11 and containing high boiling olefin condensation products but substantially no olefins which react with aluminum chloride to form a sludge is withdrawn through line 18 containing valve 19 and conducted to lines 20 and 21 provided with valves 22 and 23 and discharging into mixers 24 and 25, respectively. Fresh aluminum chloride may be added to mixer 24 by way of line 26 and valve 27. The hydrocarbon oil and aluminum chloride may be mixed with a relatively light aluminum chloride-containing sludge formed as hereinafter set forth and introduced from line 28 through line 29 and valve 30 to mixer 24 provided with a mixing device 31 which may comprise a reciprocating vertical shaft supporting a plurality of perforated plates. By means of mixer 24 an intimate suspension is formed consisting of aluminum chloride and relatively light sludge dispersed in oil. Said suspension is withdrawn from mixer 24 through line 32 and valve 33 by pump 34 which discharges through line 35 and valve 36 to reactor 37 provided with means for maintaining a temperature in the approximate range of 50–200° C. under a pressure between about 25 and about 200 atmospheres while the charged suspension is subjected to contact with a mixture of hydrogen and hydrogen chloride introduced from an outside source through line 38 and valve 39. Under these conditions of operation the substantially saturated liquid hydrocarbons undergo decomposition, hydrogenation, and isomerization reactions forming substantial yields of light gases, isobutane, branched chain paraffin hydrocarbons of gasoline boiling range, and a relatively higher boiling fraction.

Products from reactor 37 may be withdrawn therefrom through line 40 and valve 41 to settler 43 in which the hydrocarbonaceous materials may be separated as an upper layer from a relatively light sludge comprising the aluminum chloride and sludge introduced to mixer 24 as hereinabove set forth. The hydrocarbon layer may be withdrawn from settler 43 through line 44 and valve 45 to fractionator 46 which may comprise stripping and distilling equipment of adequate design for separating light gases comprising essentially propane and lower boiling paraffins admixed with hydrogen and hydrogen chloride, an isobutane fraction, a substantially saturated gasoline fraction, and a higher boiling residue. Light gases separated in fractionator 46 may be discharged through line 47 and valve 48 and, if desired, said gases may be recycled through line 49 and valve 50 to reactor 37 in which the substantially saturated hydrocarbon fraction is subjected to destructive hydrogenation as hereinabove described. Isobutane may be withdrawn from fractionator 46 through line 51 and valve 52 to storage, gasoline may be withdrawn similarly through line 53 and valve 54, while higher boiling hydrocarbonaceous materials, generally classed as residue, may be discharged through line 55 and valve 56.

Relatively light sludge separated from the destructive hydrogenation products in settler 43 may be withdrawn therefrom through line 57 and valve 58 by pump 59 which discharges through line 60 and valve 61 to line 15, already mentioned, through which a relatively heavy sludge is being conducted to the aforementioned aluminum chloride recovery chamber 17. A portion of the relatively light sludge being discharged through line 60 may be withdrawn therefrom through line 28, already mentioned, containing valve 62, and conducted therethrough to mixer 25, already mentioned, or to mixer 24 by way of line 29 and valve 30. If desired, the relatively light sludge being returned to mixers 24 and 25 may be commingled in line 28 with a portion of the substantially saturated hydrocarbon fraction introduced thereto from line 18 through branch line 63 and valve 64 to pump 65 discharging through line 66 and valve 67 to line 28. Such a mixing of relatively light sludge with hydrocarbon oil facilitates recycling of the former to mixers 24 and 25.

Relatively heavy sludge or a mixture of light and heavy sludge introduced to recovery chamber 17 may therein be treated with hydrogen and hydrogen chloride at a temperature in the approximate range of 150–250° C. under superatmospheric pressure to convert the aluminum chloride-containing sludge into isoparaffinic hydrocarbons and substantially pure aluminum chloride. If desired, aluminum chloride may be introduced to recovery chamber 17 through line 68 and valve 69 to assist in the conversion of the aluminum chloride-containing sludge into substantially saturated hydrocarbons and relatively pure aluminum chloride. The recovered aluminum chloride may be discharged through line 70 and valve 71 to storage or it may be conducted by means not shown to the various points in the process at which fresh aluminum chloride is introduced. Hydrogen and hydrogen chloride needed for effecting recovery of aluminum chloride in chamber 17 may be introduced thereto through line 72, valve 73, line 74, and valve 75. Hydrocarbons formed by this treatment of aluminum chloride-containing sludge may be discharged from chamber 17 through line 76 and valves 77 and 78 to further treatment not shown for separation and recovery of hydrogen, hydrogen chloride, and gaseous and liquid hydrocarbons. If desired, the products being discharged through valve 78 may be introduced to fractionator 46, by means not shown, and therein separated into desired fractions. Also a portion of the mixture being discharged through line 76 may be recycled to recovery chamber 17 by way of line 74 and valve 75.

Following the process flow as hereinabove set forth, fresh but impure aluminum chloride may be charged through line 68 to recovery chamber 17 not only to assist in the recovery of aluminum chloride from the sludge but to purify the fresh aluminum chloride introduced by leaving in chamber 17 non-volatile impurities as iron, aluminum oxychloride, coke, etc., which may be discharged therefrom through line 87 and valve 88, both of which may be of suitable design and dimensions to permit accumulation and removal of such substantially non-volatile impurities.

A portion of the substantially saturated hydrocarbon oil being recycled through line 18 may be conducted through branch line 21 and valve 23 to mixer 25 in which it is commingled with a portion of a relatively light sludge being conducted through line 28 as hereinabove set forth. Aluminum chloride from an outside source or aluminum chloride discharged from recovery chamber 17, as aforementioned, may be introduced through line 79 and valve 80 to mixer 25 provided with a mixing device 81 which may comprise a reciprocating vertical shaft supporting a plurality of perforated plates. By means of mixer 25 an intimate suspension is formed consisting of aluminum chloride and a relatively light sludge dispersed in a substantially saturated oil. Such an intimate suspension may be withdrawn from mixer 25 through line 82 and valve 83 by pump 84 which discharges through line 85 and valve 86 to reactor 6, already mentioned, in which the hydrocarbon oil charged is treated with the suspension containing aluminum chloride and light sludge in order to decrease the unsaturation of the oil charged to the process.

The addition of the relatively light sludge to the hydrocarbon oil introduced to mixers 24 and 25 assists substantially in dispersing the aluminum chloride admitted to said mixers.

While the above described process flow shows addition of aluminum chloride to the relatively heavy sludge being subjected to treatment with hydrogen and hydrogen chloride in recovery chamber 17, the process may be carried out in the absence of added aluminum chloride under otherwise substantially the same conditions. The presence of fresh aluminum chloride in chamber 17 assists, however, in destructive hydrogenation of the components of the sludge and thus facilitates recovery from the sludge of substantially anhydrous aluminum chloride and paraffinic and naphthenic hydrocarbons formed from the olefinic and aromatic hydrocarbons assumed to exist therein in the form of metallo-organic compounds or of some type of addition product by the aluminum chloride and the olefinic and/or aromatic hydrocarbons.

The following specific example is given as illustrative of the process of this invention but with no intention of unduly limiting its generally broad scope.

A Mid-Continent gas oil containing approximately 10% of olefinic hydrocarbons and 12% of aromatic hydrocarbons in admixture with paraffins and naphthenes may be contacted with a suspension in a saturated oil of aluminum chloride and a relatively light aluminum chloride-containing sludge at approximately 20° C. to produce a relatively heavy sludge and a substantially saturated oil comprising essentially paraffins, naphthenes, and alkylated aromatics. Said substantially saturated oil in admixture with another portion of said suspension of fresh aluminum chloride and a relatively light sludge may be subjected to the action of hydrogen and hydrogen chloride at approximately 150° C. to produce approximately 30% by weight of isobutane, 40% by weight of a substantially saturated gasoline of 80 octane number, and a relatively light sludge suitable for further use in the process.

The character of the process of the present invention and its commercial value are evident from the preceding specification and example given, although neither section is intended to unduly limit its generally broad scope.

I claim as my invention:

1. A process for the conversion of hydrocarbon oil, which comprises refining said oil in the presence of a mixture, comprising aluminum chloride and a relatively light aluminum chloride sludge, under conditions of temperature and pressure selective in effecting removal of olefins and aromatics to form a substantially saturated oil and a relatively heavy aluminum chloride sludge, subjecting the substantially saturated oil to destructive hydrogenation in the presence of hydrogen, hydrogen chloride and a catalyst comprising aluminum chloride, separating resultant conversion products from aluminum chloride sludge formed in the reaction, recovering the former and supplying at least a portion of the latter to the refining step as said relatively light aluminum chloride sludge.

2. The process of claim 1 further characterized in that a portion of the substantially saturated oil is added to said mixture as a carrier for the aluminum chloride and relatively light aluminum chloride sludge.

3. The process of claim 1 further characterized in that the refining of said hydrocarbon oil is accomplished at a temperature of about −10 to 50° C.

4. A process for the conversion of hydrocarbon oil, which comprises refining said oil in the presence of a relatively light aluminum chloride sludge under conditions of temperature and pressure selective in effecting removal of olefins and aromatics to form a substantially saturated oil and a relatively heavy aluminum chloride sludge, subjecting the substantially saturated oil to destructive hydrogenation in the presence of hydrogen, hydrogen chloride and a catalyst comprising aluminum chloride, separating resultant conversion products from aluminum chloride sludge formed in the reaction, recovering the former and supplying at least a portion of the latter to the refining step as said relatively light aluminum chloride sludge.

5. The process of claim 4 further characterized in that the catalyst for the catalytic conversion step comprises a mixture of fresh aluminum chloride and a portion of the aluminum chloride sludge formed in the same step.

6. A process for the conversion of hydrocarbon oil, which comprises refining said oil in the presence of a mixture comprising aluminum chloride and a relatively light aluminum chloride sludge, under conditions of temperature and pressure selective in effecting removal of olefins and aromatics to form a substantially saturated oil and a relatively heavy aluminum chloride sludge, separating the substantially saturated oil from the relatively heavy aluminum chloride sludge, subjecting the substantially saturated oil to destructive hydrogenation in the presence of hydrogen, hydrogen chloride and a catalyst comprising aluminum chloride, separating resultant conversion products from aluminum chloride sludge formed in the reaction, recovering the former, supplying at least a portion of said aluminum chloride sludge to the refining step as said relatively light aluminum chloride sludge, combining the remaining portion of said aluminum chloride sludge with said relatively heavy aluminum chloride sludge, subjecting the mixture to heat and pressure in the presence of hydrogen and hydrogen chloride to liberate substantially pure aluminum chloride and hydrocarbons contained therein, and returning at least a portion of said substantially pure aluminum chloride to the pretreating and conversion step.

7. A process for the conversion of hydrocarbon oil, which comprises refining said oil in the presence of a mixture comprising aluminum chloride and a relatively light aluminum chloride sludge, under conditions of temperature and pressure selective in effecting removal of olefins and aromatics to form a substantially saturated oil and a relatively heavy aluminum chloride sludge, separating the substantially saturated oil from the relatively heavy aluminum chloride sludge, subjecting the substantially saturated oil to destructive hydrogenation in the presence of hydrogen, hydrogen chloride and a catalyst comprising aluminum chloride, separating resultant conversion products from aluminum chloride sludge formed in the reaction, recovering the former, supplying at least a portion of said aluminum chloride sludge to the refining step as said relatively light aluminum chloride sludge, combining the remaining portion of said aluminum chloride sludge with said relatively heavy aluminum chloride sludge and fresh aluminum chloride, and subjecting the mixture to heat and pressure in the presence of hydrogen and hydrogen chloride to liberate substantially pure aluminum chloride and hydrocarbons contained therein, and returning at least a portion of said substantially pure aluminum chloride to the pretreating and conversion step.

LOUIS SCHMERLING.